Patented Dec. 1, 1953

2,661,264

UNITED STATES PATENT OFFICE 2,661,264

NITROGEN AND PHOSPHORUS CONTAINING PRODUCT AND PROCESS FOR PRODUCING SAME

John E. Malowan, Dayton, Ohio, assignor to Monsanto Chemical Company, St. Louis, Mo., a corporation of Delaware No Drawing. Application June 21, 1950, Serial No. 169,513

8 Claims. (Cl. 23—14)

This invention relates to a water-soluble composition of matter containing principally nitrogen and phosphorus in chemically combined form.

An object of the invention is the production of compositions of matter containing combined nitrogen and phosphorus in a form which has an alkaline reaction and which likewise is highly reactive with cellulose.

In the prior art certain related products referred to as di-imido diphosphoric acids have been prepared by the reaction of ammonia with phosphorus oxychloride. This reaction has also been carried out by first dissolving the phosphorus oxychloride in benzene and then treating the solution with ammonium carbamate (Mente. Ann. 248 244 (1888)). Many of the products described in the literature contain varying amounts of combined chlorine which is difficult to eliminate from the product and which is extremely undesirable in the technical application of these products.

When the prior art products are prepared by the methods described in the literature the aqueous solutions of the products possess an acid reaction. For many purposes it is desirable to have a material which has at least a neutral and preferably a somewhat alkaline reaction in aqueous solution. This is particularly essential when the product is to be applied to cellulosic products, or used or stored in contact with metallic surfaces, such as iron, which are readily corroded under acid conditions. It has been found that by carrying out the reaction between phosphorus oxychloride and ammonia under carefully controlled conditions, it is possible to obtain a product having a molecular weight of between 180 and 300 and which has the property of being substantially completely soluble in water, the solution so formed possessing an alkaline reaction.

In carrying out the process of the invention to produce the present products, the preparation may suitably commence with the solution of phosphorus oxychloride in a solvent. The phosphorus oxychloride so dissolved is then reacted with ammonia in gaseous or liquid form with suitable agitation. The temperature should be maintained below 100° C. during the addition of the ammonia. However, after the addition of at least the stoichiometric proportion of ammonia (5 moles per mole of $POCl_3$) the temperature is raised and the product heated to at least 110° C., but not above 150° C. It has been found that the temperature control within the above limits is essential to prevent the formation of a water-insoluble product on the one hand, and on the other hand to alter the intermediate product so that the subsequent separation and purification steps can be carried out successfully. The reaction of phosphorus oxychloride with ammonia, followed by heating the reaction product to at least 110° C., but not above 150° C., yields the desired composition in a form insoluble in liquid anhydrous ammonia. Ammonium chloride is formed as a by-product by reaction of ammonia with the chlorine present in the phosphorus oxychloride. As a result of the conditions under which the present product is prepared, it has been found to be possible to form the nitrogen-phosphorus product so that it possesses solubility characteristics enabling the subsequent separation of the product from the ammonium chloride to be carried out by differential solubility methods. At the same time the desired product is obtained in a form which is highly reactive with cellulose.

Preferred solvents for carrying out the production of the initial condensation product of ammonia with phosphorus oxychloride are any inert liquid, such as kerosene, naphtha, hexane, benzene, acetone, or other organic liquids which do not react with ammonia or phosphorus oxychloride.

By reason of the method of preparation employed, the solubility of the initial nitrogen-phosphorus-containing product is so changed that the product may be separated from the by-product ammonium chloride by methods involving treatment with various solvents. These methods of separation are illustrative of the way in which the separation may be effected.

A. Treatment with a limited amount of water, such as three-fourths as much as the weight of the crude mixture. This treatment may be so carried out that the water-soluble nitrogen- and phosphorus-containing product is dissolved, leaving all or substantially all of the ammonium chloride as a solid, which can be removed by filtration. The nitrogen-phosphorus product can be recovered from the water-solution by addition thereto of methanol. Under these conditions the nitrogen-phosphorus compound is precipitated while any ammonium chloride present in the product at this stage is retained in solution.

B. Treatment with liquid anhydrous ammonia, such as from ten to twenty times the amount of the final product. This treatment serves to preferentially dissolve the ammonium chloride, the nitrogen-phosphorus compound being insoluble in this solvent. Filtration of the ammonia solution can then be carried out, and in this way after evaporation of the liquid ammonia, a substantially chlorine-free product is obtained.

C. Treatment with methanol. The nitrogen-phosphorus product is insoluble in methanol, whereas ammonium chloride is soluble therein. Utilizing these facts the crude reaction product, containing both the nitrogen-phosphorus compound and ammonium chloride, is leached with methanol and the ammonium chloride substantially completely removed. The proportion of methanol may be from ten to fifteen times the weight of the compound, using methanol in an anhydrous state or containing some water.

By any of the above methods the nitrogen-phosphorus-containing product may be obtained in a substantially chlorine-free form which may, when dissolved in water, yield a solution having a pH between the limits of 7.0 to 8.5. It is a white, non-hygroscopic powder.

The following examples illustrate certain embodiments of the present invention:

EXAMPLE 1

Phosphorus oxychloride to the amount of 90 pounds is dissolved in 90 gallons of hexane contained in an autoclave. The solution is heated to approximately 55° C. while stirring, and gaseous anhydrous ammonia is added thereto. Although an exothermic reaction takes place, the reaction may be carried out at about 75° C. by cooling the vessel. Ammonia to the extent of 50 pounds (5 moles per mole of phosphorus oxychloride) is added to the autoclave over a two hour period. An excess of ammonia may be used. After the addition of this amount of ammonia, the autoclave is sealed and then heated to about 130° C. for approximately 1½ hours. After the completion of the heating period, the reaction mixture is cooled to below 40° C. and then transferred to a second vessel containing a filter element and provided with external heating means. By applying heat to the autoclave contents the hexane present is distilled off, condensed and recovered. The remaining solids which consist of a mixture of the nitrogen- and phosphorus-containing product with ammonium chloride are then extracted under pressure with anhydrous ammonia at about room temperature. A total of about 20 pounds of ammonia per pound of final product is employed, although it is also possible to carry out an extraction with 10 pounds of ammonia per pound of product. The slurry of product in anhydrous liquid ammonia was filtered by means of a filtering device contained within the autoclave. In this manner, substantially all of the ammonium chloride is leached from the residual solids. After the last extraction the residual ammonia adhering to the product is removed by evaporation induced by the application of heat to the product. The yield of the nitrogen-phosphorus product obtained is approximately 85% of the theoretical. The product contains 33.8% nitrogen, 35.1% phosphorus, N/P ratio=2.14.

The temperature at which the initial reaction of ammonia and phosphorus oxychloride is carried out should be maintained below 100° C. Apparently there is no lower limit to this temperature since the reaction has been successfully carried out at extremely low temperatures. However, the subsequent heating of the first-formed reaction product should be carried out at a temperature of at least 110° C., but not in excess of 150° C. Moreover, the temperatures within this range are somewhat dependent upon the time of heating the product; at the higher temperatures the time is shorter, while at lower temperatures the time is correspondingly longer. Thus when employing temperatures as high as 150° C., the time of heating should not be substantially in excess of 30 minutes. When employing temperatures as low as 110° C., the time of heating should be at least six hours, since the initial nitrogen-phosphorus-containing product is soluble in liquid anhydrous ammonia while the product which has been heated within the above range of temperatures is insoluble in this same solvent. The correct time of heating at any temperature may be readily determined by observation of the solubility property.

The nature of the nitrogen-phosphorus-containing product has not been completely determined, but it would appear that the product consists of a mixture of closely related compounds probably containing the group:

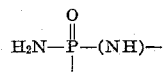

However, the compounds present in the mixture contain additional radicals, since the phosphorus-nitrogen ratio of our products is greater than 2.0 being in the range of from 2.1 to 2.3, depending upon the temperature employed in the heating step. The molecular weight of the nitrogen-phosphorus product as determined cryoscopically is in the range of from 180 to 300, a preferred range being from 200 to 250.

The product so obtained is soluble in water, the pH thereof being in the range of from 7.0 to 8.5. It is soluble also in glycerine, ethylene glycol and formamide.

EXAMPLE 2

A pressure vessel is charged with liquid ammonia which was then cooled by refrigeration. Phosphorus oxychloride is added in one-tenth molar proportion, so that the excess ammonia will dissolve the by-product ammonium chloride. After the addition of the reactants, the entire reaction mass is heated to 130° C. in order to complete the reaction. The vessel and its charge is then cooled, and the ammonia together with dissolved ammonium chloride withdrawn. The reaction product is further contacted with additional ammonia to dissolve the residual ammonium chloride leaving the ammonia-insoluble reaction product as a white amorphous powder.

A modified form of the nitrogen-phosphorus compound may also be prepared as a gel instead of the characteristic white powder. This gel is apparently a true colloid and as such is advantageous in certain technical applications, such as in machine or roller coating of the composition on fabrics, fibers or paper. The molecular structure of the gel-type composition may result from a cross-linking effect in a linear, low-molecular weight polymerization of molecular aggregates based upon multiples of the fundamental grouping,

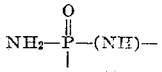

Such gels may be dispersed in water or other vehicles.

The gel form may be obtained from the above-described intermediates by heating either the purified final product, or the original reaction mixture to about 140° C. for at least one-half hour. Such treatment may also be accomplished at lower temperatures, such as in the range of 60° C.–140° C. by longer heating. The material undergoing transformation may be in the purified form, or may have ammonium chloride present, and may be heated directly or in a carrier liquid such as kerosene or other non-reactive liquid.

By reason of the high solubility of the present products in water, aqueous solutions containing up to 70% by weight of solids may be readily prepared. This is advantageous since it is thereby possible to obtain a thorough impregnation of cellulosic textile products in a single treatment and thereby to obtain effective flame-resistant products. The process of treating cellulosic materials to render them fire-retardant and the products obtained thereby are described and claimed in co-pending application Serial No. 169,506, filed June 21, 1950, which case is assigned to the same assignee as is the present case.

Further characterization of the nitrogen-phosphorus products and an indication of their reactivity with cellulose is afforded by application of the test procedure described by F. V. Davis et al. in the Journal of the Textile Institute, 40, pages T 839–T 854 (1949).

For the present purpose the method of Davis et al. was modified in such a manner so as to increase the criticality of the reactivity test. The modification consisted in washing the treated fabric with a synthetic detergent solution at 120° F., followed by a cycle of three rinses, also conducted at 120° F., rather than by conducting the entire washing in distilled water. The degree of reactivity was then obtained by drying the impregnated cotton fabric at 220° F., and weighing the fabric samples to determine the amount of the nitrogen-phosphorus product remaining, which it may be assumed, had combined chemically with the cellulose of the fabric.

The test utilized to determine the cellulose reactivity of the present and related products is carried out by contacting a standard sample of desired cotton of sheeting weight, with an aqueous solution containing 6% by weight of solids of the present nitrogen-phosphorus compound. The cotton is allowed to take up about 100% of its weight of the solution after which the impregnated sample is dried and then cured by heating for ten minutes at 150° C. The sample is then washed at 120° F. in a synthetic detergent-containing solution, which washing is then followed by three standard rinses with water also carried out at 120° F. After washing and rinsing, as described above, followed by drying to constant weight, the sample is weighed and the add-on thus determined. The amount of nitrogen-phosphorus compound retained by the washed sample in comparison with the amount retained on an unwashed sample is a measure of the amount of the product adhering to the fabric by reason of its chemical reactivity therewith. The relative amounts can be expressed in per cent. As a result of this test the present nitrogen-phosphorus compound is found to possess a reactivity of 80–90%, which means that 80–90% of the nitrogen-phosphorus compound applied to the cellulose has combined chemically therewith. In comparison with the present product the higher molecular weight, water-insoluble products which are described in application Serial No. 68,402, filed December 30, 1948, applied by means of an aqueous dispersion, have a reactivity of approximately 20%. The above reactivity test may also be employed to evaluate the cellulose reactivity of other prior art materials such, for example, as guanidine phosphate, which material was found by this test to have a reactivity with cellulose of 31%.

The table below summarizes the cellulose reactivity of the several phosphorus compounds mentioned above and includes in addition several other products. The data obtained with the urea-diammonium phosphorus composition were taken from the book by R. W. Little; Flameproofing of Textile Fabrics.

Table

CELLULOSE REACTIVITY OF PHOSPHORUS COMPOUNDS

| | Per cent |
|---|---|
| Nitrogen-phosphorus product of present invention | 80–90 |
| Water-insoluble nitrogen-phosphorus product | 20 |
| Diammonium phosphate | 0 |
| Urea-diammonium phosphate | 35 |
| Guanidine phosphate | 31 |
| Diammonium pyrophosphate | (Degraded, causing fiber loss) |

What is claimed is:

1. The process for producing a nitrogen and phosphorus-containing product which comprises reacting one mole of phosphorus oxychloride with at least five moles of ammonia in an inert solvent which dissolves but does not react with the said reactants at a temperature below 100° C. to produce an initially-formed nitrogen and phosphorus-containing product mixed with ammonium chloride, then heating said initially-formed nitrogen-phosphorus-containing product to a temperature of at least 110° C., but not above 150° C., until a nitrogen-phosphorus-containing product substantially free of chemically combined chlorine is obtained and said product becomes substantially insoluble in liquid anhydrous ammonia, removing the said solvent and thereafter separating said substantially chlorine-free nitrogen-phosphorus-product from ammonium chloride by leaching said product with liquid anhydrous ammonia.

2. The process for producing a nitrogen and phosphorus-containing product substantially free of chlorine which comprises reacting one mole of phosphorus oxychloride with at least five moles of ammonia in an inert solvent which dissolves but does not react with the said reactants at a temperature below 100° C., to produce an initially formed nitrogen-phosphorus-containing product mixed with ammonium chloride then heating said initially formed nitrogen-phosphorus-containing product to a temperature of at least 110° C., but below 150° C. until said initially formed product is rendered substantially insoluble in liquid anhydrous ammonia, removing the said solvent and thereafter separating said nitrogen-phosphorus-containing product from ammonium chloride by treating said mixture with liquid anhydrous ammonia.

3. The process for producing a nitrogen and phosphorus-containing product substantially free of chlorine which comprises reacting one mole of phosphorus oxychloride with at least five moles of ammonia in an inert solvent which dissolves but does not react with the said reactants at a temperature below 100° C., to produce an initially-formed, anhydrous-ammonia-soluble product mixed with ammonium chloride, then heating said initially-formed nitrogen and phosphorus-containing product to a temperature of at least 110° C., but below 150° C., until said nitrogen and phosphorus-containing product is rendered substantially insoluble in liquid anhydrous ammonia.

4. The process for producing a nitrogen and phosphorus-containing product substantially free of chlorine which comprises reacting one mole of phosphorus oxychloride with at least five moles of ammonia in an inert solvent which dissolves but does not react with the said reactants at a temperature below 100° C., to produce an initially-formed, anhydrous-ammonia-soluble product mixed with ammonium chloride, then heating said initially-formed product to a temperature of at least 110° C., but below 150° C. until said nitrogen and phosphorus-containing product is rendered substantially insoluble in liquid anhydrous ammonia, removing the said solvent and thereafter separating said nitrogen-phosphorus-containing product from ammonium chloride by treating said mixture with liquid anhydrous ammonia.

5. The water-soluble reaction product of one mole of phosphorus oxychloride with at least five moles of anhydrous ammonia, produced by reacting the said components dissolved in an inert solvent which dissolves but does not react with the said components, said reaction being carried out at a temperature below 100° C. to produce an initially-formed nitrogen-phosphorus-containing product mixed with ammonium chloride, and then heating said initially-formed nitrogen-phosphorus-containing product to a temperature of at least 110° C. but below 150° C. until said initially-formed product is rendered substantially insoluble in liquid anhydrous ammonia, removing the said solvent and thereafter separating said nitrogen-phosphorus-containing product from ammonium chloride by treating said mixture with liquid anhydrous ammonia said reaction product having a molecular weight within the limits of from 180 to 300, a nitrogen to phosphorus atomic ratio within the limits of from 2.1 to 2.3, and when dissolved as a saturated solution in water yielding a solution having a pH within the limits of 7.0 to 8.5.

6. The water-soluble reaction product of one mole of phosphorus oxychloride with at least five moles of anhydrous ammonia, produced by reacting the said components in an inert solvent which dissolves but does not react with the said reactants, said reaction being carried out at a temperature below 100° C. to produce an initially-formed, anhydrous-ammonia-soluble product mixed with ammonium chloride, then heating said initially-formed nitrogen and phosphorus-containing product to a temperature of at least 110° C. but below 150° C., until said nitrogen and phosphorus-containing product is rendered substantially insoluble in liquid anhydrous ammonia said reaction product having a molecular weight within the limits of from 180 to 200, a nitrogen to phosphorus atomic ratio within the limits of from 2.1 to 2.3, and when dissolved as a saturated solution in water yielding a solution having a pH within the limits of 7.0 to 8.5.

7. The water-soluble reaction product of one mole of phosphorus oxychloride with at least five moles of anhydrous ammonia obtained by the reaction of the said components dissolved in an inert solvent which dissolves but does not react with the said reactants, said reaction being carried out at a temperature below 100° C. to produce an initially-formed, anhydrous ammonia-soluble product mixed with ammonium chloride, then heating said initially-formed product to a temperature of at least 110° C. but below 150° C. until said nitrogen and phosphorus-containing product is rendered substantially insoluble in liquid anhydrous ammonia, removing the said solvent and thereafter separating said nitrogen-phosphorus-containing product from ammonium chloride by selectively dissolving the ammonium chloride in a solvent therefor said reaction product having a molecular weight within the limits of from 180 to 300, a nitrogen to phosphorus atomic ratio within the limits of from 2.1 to 2.3, and when dissolved as a saturated solution in water yielding a solution having a pH within the limits of 7.0 to 8.5.

8. The process for producing a water-soluble, nitrogen- and phosphorus-containing product substantially free of chlorine which comprises reacting one mole of phosphorus oxychloride with at least five moles of anhydrous ammonia in an inert solvent which dissolves but does not react with the said reactants at a temperature below 100° C. to produce an initially-formed nitrogen-phosphorus-containing product mixed with ammonium chloride, then heating said initially-formed nitrogen-phosphorus-containing product to a temperature of at least 110° C. but below 150° C. until said initially-formed product is rendered substantially insoluble in liquid anhydrous ammonia and has a molecular weight of from 180 to 300, removing the said solvent and thereafter separating said nitrogen-phosphorus-containing product from ammonium chloride by treating said mixture with liquid anhydrous ammonia.

JOHN E. MALOWAN.

References Cited in the file of this patent

UNITED STATES PATENTS

| Number | Name | Date |
|---|---|---|
| 2,052,886 | Leroy | Sept. 1, 1936 |
| 2,122,122 | Woodstock | June 28, 1938 |
| 2,163,085 | Cupery | June 20, 1939 |
| 2,401,440 | Thomas et al. | June 4, 1946 |
| 2,482,756 | Ford | Sept. 27, 1949 |

FOREIGN PATENTS

| Number | Country | Date |
|---|---|---|
| 16,372 | Great Britain | June 4, 1903 |

OTHER REFERENCES

Schiff, Liebigs Ann., vol. 101 (1957) pages 299–302.

Gladstone, Journ. Chem. Soc., vol. 7 (1869) pages 16–19.